April 19, 1960  H. L. TOWER  2,933,582
INDUCTION WELDER
Filed March 31, 1958
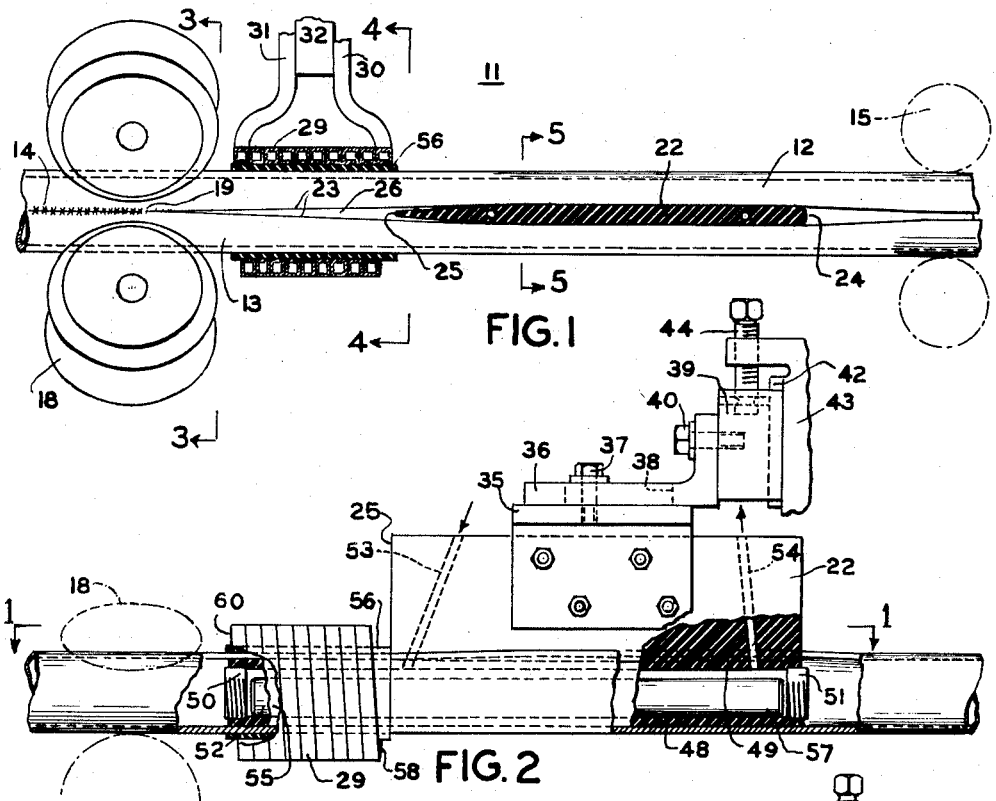
FIG. 1
FIG. 2
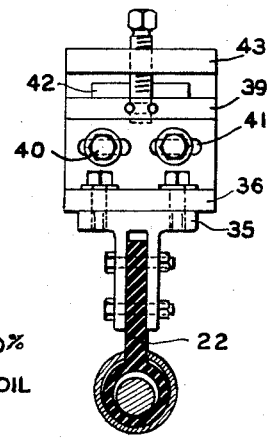
FIG. 5
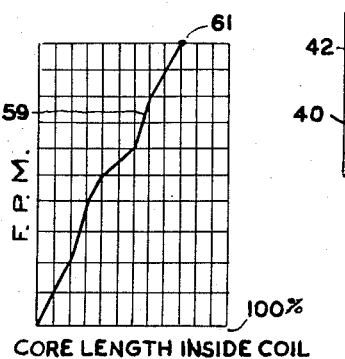
FIG. 6
FIG. 4
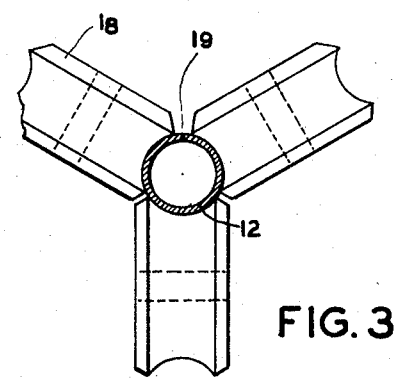
FIG. 3
INVENTOR.
HUBERT L. TOWER
BY
Woodling & Krost
Attys

2,933,582
INDUCTION WELDER

Hubert L. Tower, Euclid, Ohio, assignor to American Roller Die Corp., a corporation of Ohio Application March 31, 1958, Serial No. 725,327

14 Claims. (Cl. 219—8.5)

The invention relates in general to induction welders and more particularly to tubing welders to weld tubing from preformed skelp.

Many forms of tubing welders and induction tubing welders have been devised, but these have been primarily for the use of welding ferrous materials and for welding the larger sizes of tubing or pipe. In the smaller sizes of tubing, for thin wall tubing, and for non-ferrous materials, induction welders have not been particularly successful. One difficulty has been the relatively low speed at which such induction welders have been operated which makes the end product of welded tubing relatively expensive per running foot.

Accordingly, an object of the present invention is to provide a high speed economical induction tubing welder.

Another object of the invention is to provide a welder for welding small size tubing.

Another object of the invention is to provide a welder for non-ferrous materials.

Another object of the invention is to provide a welder which may be used on many forms of skelp and whether such skelp is magnetic or non-magnetic.

Another object of the invention is to provide an induction welder for concentrating the flux lines from the induction coil.

Another object of the invention is to provide an induction welder with an internal magnetic core cooperating with the induction coil.

Another object of the invention is to provide an induction welder with a longitudinally adjustable magnetic core to vary the effective power input to the tubing to be welded and hence to vary the speed at which the tubing may be welded.

Another object of the invention is to provide a longitudinal limit for the longitudinal adjustment of a magnetic core within the induction coil of a tubing welder to thus control the quality of the weld.

Other objects and a fuller understanding of this invention may be had by referring to the following description and claims, taken in conjunction with the accompanying drawing, in which:

Figure 1 is a plan view of a portion of an induction tubing welder embodying the invention;

Figure 2 is an elevational view of the welder;

Figures 3, 4, and 5 are sectional views on the lines 3—3, 4—4, and 5—5, respectively, of Figure 1; and Figure 6 is a graph of welding speed versus core displacement.

The Figures 1–5 generally show an induction tubing welder 11. This welder may have the conventional roll forming stands to progressively change flat strip stock or skelp into generally C-shaped skelp 12 ready for welding at a welding station 13 in a longitudinal seam 14 to form welded tubing. One such roll forming stand 15 has been shown, and this is merely diagrammatic of a means to feed the skelp 12 in a longitudinal path from right to left as viewed in Figures 1 and 2. It will readily be understood that any cross sectional shape of the skelp 12 may be used and a cylindrical shape has been shown merely for purposes of illustration.

Squeeze rolls 18, in this case three in number, are a form of a die means to squeeze together the edges of the skelp 12 so that they may be welded at a welding area 19. A seam guide blade 22 is positioned in the path of movement of the preformed skelp 12 and laterally positions the edges 23 of the skelp 12. The seam guide blade 22 has an entrance edge 24 and an exit edge 25 which preferably are slightly tapered to aid the smooth flow of the skelp around this seam guide blade. The blade 22 is formed of insulating material or at least has insulation contained therein to insulate the two edges 23 of the skelp 12.

The skelp in passing over this seam guide blade is spread apart between the roll forming stand 15 and the squeeze rolls 18 and, between the exit edge 25 of the blade 22 and the welding area 19, there is formed a V-shaped opening 26 with the apex of the V at the welding area 19.

An induction coil 29 closely surrounds the preformed skelp 12 at the V-shaped opening 26 and between the seam guide blade exit edge 25 and the squeeze rolls 18. This induction coil 29 may be formed of rectangular or square metallic tubing having end connections 30 and 31 which may be connected to the energizing voltage source and also connected to a liquid coolant supply and exhaust for cooling this coil 29. The energizing source may preferably be high frequency in the order of 210 to 450 kilocycles; however, higher frequencies in the order of three to fifteen megacycles may advantageously be used on many workpieces such as small diameter non-ferrous materials. The end connections 30 and 31 may be mounted on an insulator support 32 to physically support the coil 29 with the turns of the coil mutually insulated.

The seam guide blade 22 may be fixedly attached to a T-shaped support 35 in turn fastened to an L bracket 36. This latter connection is by means of bolts 37 passing through slots 38 in bracket 36 to give longitudinal adjustability to the seam guide blade 22. The L bracket 36 is bolted to a slide 39 by bolts 40 passing through horizontal slots 41 to give horizontal lateral adjustability to the seam guide blade 22. The slide 39 may be dovetailed at 42 to a fixed support 43 which is fixed to the frame of the entire welder 11. The slide 39 may be adjusted vertically by the screw 44 in order to give vertical lateral adjustability to the seam guide blade 22.

The lower end of the seam guide blade 22 carries an insulator tubular holder 48 which may be fixedly attached to the seam guide blade 22 or may be integral therewith as shown. The outer diameter of the tubular holder 48 may be designed to be closely received within the C-shaped skelp 12. The holder 48 has an internal bore 49 to form a cooling chamber together with plugs 50 and 51 on each end of this bore 49. A magnetic core 52 fits radially loosely within the cooling chamber 49. The plugs 50 and 51 prevent appreciable longitudinal movement of the core 52. This core may be a solid formed from a powdered ferrite substance with each of the individual particles substantially insulated in order to form a good magnetic path for high frequency currents without excessive hysteresis and eddy current losses. The seam guide blade 22 has a liquid coolant inlet 53 in the rearward end thereof and a liquid coolant outlet 54 in the forward end thereof. The inlet 53 may slant rearwardly, that is, in the direction of the coil 29, so as to help insure that the coolant circulates in the rearward extension 55 of the holder 48 to cool that portion of the core 52 within the coil 29. The coil 29 may be wound on a coil form 56 which is adapted to abut the rearward edge 25 of the seam guide blade 22 when the T-shaped support 35 is moved all the way to the way to the rear on the L bracket 36. The bolts 37 may be loosened and the T-shaped support 35 may be moved forwardly to withdraw the core 52 from the coil 29. The core 52 has a forward extension 57 which closely abuts the plug 51 and thus assures that the rearward end of the core 52 will be closely engaging the plug 50 so that the position of the core within the coil 29 will be known.

The length of the rearward extension 55 is less than the length of the coil 29 so that the core 52 may not be positioned completely through the coil 29. This has been found important in order to control the quality of the weld.

Figure 6 shows a graph of welding speed in feet per minute versus the length of the core within the coil. As the core is inserted into the entrance end 58 of the coil 29, the welding speed generally increases as shown by curve 59 in Figure 6. However, as the core 52 approaches the exit end 60 of the coil 29, a point is reached at about point 61 whereat the weld itself becomes irregular and the quality of the weld becomes irregular. As the core is inserted into the coil 29, a greater amount of flux from the coil is effectively coupled into the skelp 12. The flux flows longitudinally in the core and this causes circulating currents to flow in the skelp 12 as in the secondary of a transformer. These circulating currents flow circumferentially around the tubing and are concentrated along the edges 23 to heat these edges. In order to form a continuous path for these currents, they must flow generally to the welding area 19 and this continuously progressive concentration of currents, as the welding area 19 is approached, continuously and progressively heats these edges 23 to a temperature at which the fusion weld may take place at the welding area 19 under influence of the squeeze rolls 18. The greater effective length of core 52 which is within the longitudinal length of the coil 29, the more effective is the coupling between the coil 29 and the preformed skelp 12, up to the point 61 on curve 59. On one inch diameter brass tubing of .035 of an inch wall thickness this point was found to be at about a core length within the coil of about seventy-five percent of the coil length and at about three hundred feet per minute. This is a very high speed of welding compared to the prior art forms and illustrates the superiority of the present invention.

This welding set up has been used on many different forms of materials and has successfully welded aluminum such as one of the very hardest grades, 24 ST 4, at two hundred thirty feet per minute. Also, another grade of aluminum tubing which is about three-fourths hardness, such as 52 S 18, has been welded at about two hundred thirty feed per minute. Stainless steel, the Type 302 or 304, has been welded at one hundred forty feet per minute, and steel tubing which is magnetic has been welded at speeds of two hundred five feet per minute. This shows the complete adaptability of the welder 11 to weld at very high speeds both ferrous and non-ferrous materials and, in the ferrous materials, both magnetic and non-magnetic metals.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An induction welder for welding C-shaped skelp into tubing, comprising, in combination, a frame, a roll forming stand on said frame passing said C-shaped skelp to a welding station, an insulated seam guide blade carried on said frame subsequent to said roll stand, a hollow insulator cooling chamber carried on the lower end of said seam guide blade in alignment with the axis of said skelp and positioned to be surrounded by said skelp, a magnetic core carried within said cooling chamber, liquid coolant inlets and outlets to said cooling chamber in said seam guide blade, an induction coil at said welding station subsequent to said seam guide blade, means to longitudinally adjust the position of said magnetic core within said coil, and means including the exit end of said seam guide blade and the exit end of said cooling chamber to limit the advancement of said core into said coil to a position less than completely through said coil to establish a concentrated flux along the axis of said skelp to heat the edges thereof.

2. An induction tube welder for welding C-shaped skelp into welded tubing, comprising, in combination, a frame, a roll forming stand on said frame passing said C-shaped skelp to a welding station in movement generally along the axis of said skelp, an insulated seam guide blade longitudinally adjustably carried on said frame subsequent to said roll stand, a hollow insulator tube fixedly carried on the lower end of said seam guide blade in alignment with the axis of said skelp, and positioned to be surrounded by said skelp, a ferrite rod loosely carried within said insulator tube, plugs in each end of said insulator tube forming a cooling chamber for said ferrite rod, a liquid coolant inlet to said cooling chamber in the exit end of said seam guide blade, a liquid coolant outlet for said cooling chamber in the entrance end of said seam guide blade, a high frequency induction coil at said welding station immediately subsequent to and capable of abutting said seam guide blade to heat the edges of said skelp, squeeze rolls on said frame subsequent to said induction coil to squeeze together the heated edges of said skelp to effect a welding thereof, one end of said ferrite rod and said insulator tube extending longitudinally within said induction coil to establish a concentrated flux along the axis of said skelp, and the exit end of said seam guide blade abuttable with said coil to limit the advancement of said ferrite rod into said coil to a point less than completely through said coil.

3. An induction tube welder for welding C-shaped skelp into welded tubing, comprising, in combination, a frame, a roll forming stand on said frame passing said skelp to a welding station, squeeze rolls on said frame at said welding station to squeeze together the edges of said skelp, a high frequency induction coil at said welding station immediately preceding said squeeze rolls, a seam guide blade longitudinally adjustably carried on said frame between said roll stand and said induction coil, a hollow insulator tube fixedly carried on the lower end of said seam guide blade in alignment with the axis of said skelp, and positioned to be surrounded by said skelp, a ferrite rod loosely carried within said insulator tube, plugs in each end of said insulator tube forming a cooling chamber for said ferrite rod, a liquid coolant inlet to said cooling chamber in the exit end of said seam guide blade, a liquid coolant outlet for said cooling chamber in the entrance end of said seam guide blade, and one end of said ferrite rod and said insulator tube extending longitudinally within said induction coil to establish a concentrated flux along the axis of said skelp.

4. An induction welding machine for welding together the edges of C-shaped skelp, comprising, in combination, a frame, die means on said frame to squeeze together the edges of said C-shaped skelp, a seam guide blade carried on said frame, an insulator cooling chamber carried on said seam guide blade along the axis of said skelp and adapted to be surrounded by said skelp, said C-shaped skelp having a V-shaped seam opening between the exit edge of said seam guide blade and said die means with the apex of said V at said die means, a high frequency induction coil surrounding and spaced from said C-shaped skelp at said V-shaped opening, a magnetically permeable core within said cooling chamber, the exit end of said core extending within the confines of said coil, coolant inlet and outlet passages to said cooling chamber through said seam guide blade, said high frequency induction coil inducing circumferential currents in said C-shaped skelp and concentrated along said edges of said V-shaped opening to heat said edges by the flux concentrating action of said core, and means for longitudinally adjusting said seam guide blade on said frame to longitudinally adjust the position of said core relative to said coil for varying the heating effect of the induction coil on said skelp.

5. An induction welding machine for welding together in a longitudinal seam the edges of C-shaped skelp, comprising, in combination, a frame, squeeze rolls on said frame adjusted to squeeze together the edges of said C-shaped skelp, a fixed holder carried on said frame, a seam guide blade carried on said fixed holder, an insulator cylindrical cooling chamber carried on the lower end of said seam guide blade along the axis of said skelp and adapted to be surrounded by said skelp, said C-shaped skelp having a V-shaped seam opening between the exit edge of said seam guide blade and said squeeze rolls with the apex of said V at said squeeze rolls, a high frequency induction coil surrounding and spaced from said C-shaped skelp at said V-shaped opening closely adjacent the entrance end of said squeeze rolls, a magnetically permeable core within said cooling chamber, the exit end of said core extending within the confines of said coil, coolant inlet and outlet passages to said cooling chamber through said seam guide blade, said high frequency induction coil inducing circumferential currents in said C-shaped skelp and concentrated along said edges of said V-shaped opening to heat said edges by the flux concentrating action of said core, and means for adjustably carrying said seam guide blade on said fixed holder to longitudinally adjust the position of the exit end of said core relative to said coil for varying the heating effect of the induction coil on said skelp.

6. An induction welding machine for welding together in a longitudinal seam the edges of C-shaped skelp, comprising, in combination, a frame, roll forming means on said frame forming C-shaped skelp out of flat strip stock, squeeze rolls on said frame spaced from said roll forming means and adjusted to squeeze together the edges of said C-shaped skelp, a fixed holder carried on said frame, a seam guide blade carried on said fixed holder, an insulator cylindrical cooling chamber carried on the lower end of said seam guide blade along the axis of said skelp and adapted to be surrounded by said skelp, said seam guide blade maintaining the longitudinal seam of said C-shaped skelp vertically above the axis of said skelp, said C-shaped skelp having a V-shaped seam opening between the exit edge of said seam guide blade and said squeeze rolls with the apex of said V at said squeeze rolls, a high frequency induction coil of a plurality of turns surrounding and spaced from said C-shaped skelp at said V-shaped opening closely adjacent the entrance end of said squeeze rolls, a magnetically permeable core within said cooling chamber, the exit end of said core extending within the confines of said coil, coolant inlet and outlet passages to said cooling chamber through said seam guide blade, said high frequency induction coil inducing circumferential currents in said C-shaped skelp and concentrated along said edges of said V-shaped opening to heat said edges by the flux concentrating action of said core, and means for adjustably carrying said seam guide blade on said fixed holder to longitudinally adjust the position of the exit end of said core relative to said coil for varying the heating effect of the induction coil on said skelp.

7. In an induction welder having means to feed preformed skelp to squeeze rolls, the provision of a seam guide blade positioned in advance of said squeeze rolls to be positioned between the edges of said preformed skelp, an exit edge on said seam guide blade, a magnetic core carried by said seam guide blade to be within said preformed skelp, an induction coil surrounding said skelp between said blade exit edge and said squeeze rolls, the length of said coil being greater than the dimension of said core to the rear of said blade exit edge whereby said core may not be positioned completely through said coil, and means to adjust the longitudinal position of said core within said coil.

8. An induction tubing welder for C-shaped skelp, comprising, squeeze rolls to squeeze the edges of said skelp together, means to feed skelp along a path to said squeeze rolls, a seam guide blade positioned between said feed means and squeeze rolls and positioned between the edges of said C-shaped skelp to spread them apart a predetermined distance, an exit edge on said seam guide blade, a magnetic core carried on said seam guide blade to be surrounded by said skelp, an induction coil surrounding said C-shaped skelp between said exit edge of said seam guide blade and said squeeze rolls, said core extending to the rear of said seam guide blade exit edge less than the length of said coil whereby said core may not be positioned completely through said coil, means to cool said core, and means to adjust the longitudinal position of said seam guide blade to thereby adjust the longitudinal position of said core within said coil.

9. An induction tubing welder for C-shaped skelp, comprising, squeeze rolls to squeeze the edges of said skelp together, means to feed skelp to said squeeze rolls, a seam guide blade positioned between said feed means and squeeze rolls and positioned between the edges of said C-shaped skelp to spread them apart a predetermined distance, an insulated tubular holder carried on the lower end of said seam guide blade, an exit edge on said seam guide blade, a magnetic core within said holder, an induction coil surrounding said C-shaped skelp between said exit edge of said seam guide blade and said squeeze rolls, an extension on said holder rearward of said exit edge of the seam guide blade, the length of said extension being less than the length of said coil whereby the core within the holder may not be positioned completely through said coil, means to cool said core, and means to adjust the longitudinal position of said seam guide blade to thereby adjust the longitudinal position of said core within said coil.

10. An induction welder for welding tubing from C-shaped skelp, comprising, forming rolls forming said skelp into a substantially closed loop, squeeze rolls placed longitudinally of said forming rolls to squeeze the edges of said skelp together, a seam guide blade positioned between said forming and squeeze rolls and positioned between the edges of said C-shaped skelp to spread them apart a predetermined distance, an insulated tubular holder carried on the lower end of said seam guide blade, means adjustably positioning said tubular holder to position it on the axis of said C-shaped skelp, entrance and exit generally vertical edges on said seam guide blade, plugs on the entrance and exit ends of the tubular holder to form therewith a cooling chamber, a solid core of powdered ferrite within said cooling chamber, a high frequency induction coil surrounding said C-shaped skelp between the exit edge of said seam guide blade and said squeeze rolls, a rearward extension on said cooling chamber rearward of said exit edge of the seam guide blade, the length of said rearward extension being less than the length of said coil whereby the core within the cooling chamber may not be positioned completely through said coil, water inlet and outlet passages in opposite ends of said seam guide blade, means to circulate water through said water inlet and outlet and said cooling chamber to cool said core, and means to adjust the longitudinal position of said seam guide blade to thereby adjust the longitudinal position of said core within said coil.

11. In an induction welder having die means to close the edges of C-shaped skelp, the provision of an induction coil inducing current into said skelp prior to passage through said die means, a permeable core, means holding said core inside said skelp, and adjustable means to variably longitudinally position said core relative to said induction coil.

12. In an induction welder having die means to close the edges of C-shaped skelp, the provision of an induction coil inducing current into said skelp prior to passage through said die means, a permeable core, means holding said core inside said skelp, adjustable means to variably longitudinally position said core relative to said induction coil, and means to limit the longitudinal length of said core effectively cooperating with said coil.

13. In an induction welder having die means to close the edges of C-shaped skelp, the provision of means to feed said skelp to said die means, an induction coil embracing said skelp prior to passage through said die means, a permeable core, means holding said core through the open edges of said C-shaped skelp in a position surrounded by said skelp, and adjustable means to variably position said core into said induction coil from the entrance end thereof.

14. An induction welder, including, die means to close the edges of C-shaped skelp, means to feed said skelp to said die means, an induction coil embracing said skelp prior to passage through said die means, a permeable core, means holding said core through the open edges of said C-shaped skelp in a position surrounded by said skelp, adjustable means to variably position said core into said induction coil from the entrance end thereof, and means to limit the length of said core within said coil.

References Cited in the file of this patent

UNITED STATES PATENTS

| | | |
|---|---|---|
| 2,086,305 | Sessions | July 6, 1937 |
| 2,818,489 | Kalning et al. | Dec. 31, 1951 |
| 2,833,910 | Stanton et al. | May 6, 1958 |